United States Patent
Naudus, Jr. et al.

(10) Patent No.: US 6,366,589 B1
(45) Date of Patent: Apr. 2, 2002

(54) MULTIPLE PARALLEL ASYMMETRIC INTERFACES WITH REVERSED ASYMMETRIC LINKS

(75) Inventors: Stanley T. Naudus, Jr., Springfield; Jack L. Manbeck, Jr., Herndon, both of VA (US)

(73) Assignee: 3Com Corporation, Santa Clara, CA (US)

( * ) Notice: Subject to any disclaimer, the term of this patent is extended or adjusted under 35 U.S.C. 154(b) by 0 days.

(21) Appl. No.: 09/067,133

(22) Filed: Apr. 27, 1998

(51) Int. Cl.[7] ................................................. H04L 5/14
(52) U.S. Cl. ........................................ 370/468; 370/282
(58) Field of Search ................................ 370/230, 235, 370/278, 282, 412, 428, 436, 465, 468, 473, 478, 437, 295; 375/222; 379/93.01, 93.05, 93.33

(56) References Cited

U.S. PATENT DOCUMENTS

| | | | |
|---|---|---|---|
| 5,231,633 A | * | 7/1993 | Hluchyj et al. ............. 370/412 |
| 5,497,371 A | * | 3/1996 | Ellis et al. .................... 370/412 |
| 5,812,786 A | * | 9/1998 | Seazholtz et al. ............ 370/486 |
| 5,870,629 A | * | 2/1999 | Borden et al. ............... 370/412 |
| 6,021,120 A | * | 2/2000 | Beyda et al. ................. 370/282 |
| 6,069,879 A | * | 5/2000 | Chatter ........................ 370/437 |

* cited by examiner

*Primary Examiner*—Wellington Chin
*Assistant Examiner*—Frank Duong
(74) *Attorney, Agent, or Firm*—McDonnell Boehnen Hulbert & Berghoff

(57) ABSTRACT

A method and apparatus for communicating packet fragments over a symmetrical interface with reversed asymmetrical links. The method comprises the steps of coupling a first asymmetric interface to a computing device. The first interface has an up-link transmission rate greater than its down-link receiving rate. A second asymmetric interface is coupled to the computing device. The second interface has a down-link rate and an up-link rate. The down-link rate is greater than the up-link rate, the difference between the two rates defining a second asymmetric difference that is substantially equal to the first asymmetric difference. The apparatus comprises a first asymmetric interface having an up-link rate and a down-link rate. The down-link rate is less than the up-link rate wherein a difference between the up-link rate and the down-link rate defines a first asymmetric difference. A second asymmetric interface has a down-link rate and an up-link rate. The up-link rate is less than the down-link rate wherein a difference between the down-link rate and the up-link rate defines a second asymmetric difference that is generally equivalent to the first asymmetric difference.

31 Claims, 7 Drawing Sheets

US 6,366,589 B1

MULTIPLE PARALLEL ASYMMETRIC INTERFACES WITH REVERSED ASYMMETRIC LINKS

BACKGROUND OF THE INVENTION

A. Field of the Invention

This invention relates to the field of telecommunications and more specifically to a method and apparatus for communicating packet fragments over a symmetrical interface with reversed asymmetrical links.

B. Description of Related Art and Advantages of the Invention

Various types of asymmetric communication techniques are utilized for data transmission. These types of communication techniques include Asymmetric Digital Subscriber Line (ADSL), Cable Modems (High Frequency Cable), and X2 Technology™ from 3Com Corporation. These techniques utilize an interface that communicates information asymmetrically. Information is communicated asymmetrically since the interface has a disparity in transmission rates. In other words, an asymmetric device has a greater rate of up-link data transmission than down-link data transmission or visa-versa. For example, in the case of ADSL, the data transmission rate or bandwidth may be 640 kilobytes in one direction (either the device's up-link transmission rate or down-link receiving rate) and 4 megabytes in the opposite direction. For ADSL, therefore, the difference between the up-link and the down-link rates or the asymmetric difference represents approximately a six fold difference in bandwidth.

Asymmetric interfaces may be supplied in two types: either client access based or server access based. The client access based interface has a greater down-link receiving rate than its corresponding up-link transmitting rate. The user access based interface is ideal in communication applications requiring fast down-link rates (e.g., a personal computer accessing the world-wide-web). Conversely, a server access based interface has a greater up-link transmission rate than its corresponding down-link receiving rate. The server access based interface is ideal in communication applications requiring fast link rates (e.g., a World-Wide-Web server).

One problem associated with such asymmetric interfaces is the asymmetric difference. A data transmitting or receiving device such as a personal computer or server coupled to an asymmetric interface will not be able to up-link and down-link with the same amount of bandwidth. Therefore, the data transmission device, such as a computer, a World Wide Web or a network server will have limitations on its rate of transmission vis-à-vis its down-linking or up-linking speeds.

SUMMARY OF THE INVENTION

The present invention relates to a method and apparatus for communicating packet fragments over a symmetrical interface with reversed asymmetrical links. In a first aspect of the invention, a method for communicating packet fragments over a symmetrical interface with reversed asymmetrical links comprises the steps of coupling a first asymmetric interface to a computing device. The first asymmetric interface has an up-link transmission rate that is greater than its down-link receiving rate. The difference between the up-link rate and the down-link rate defining a first asymmetric difference. A second asymmetric interface is coupled to the computing device. The second asymmetric interface having a down-link receiving rate and an up-link transmission rate. The down-link rate is greater than the up-link rate and the difference between the down-link rate and the up-link rate of the second asymmetric interface defines a second asymmetric difference. The second asymmetric difference being substantially equal to the first asymmetric difference.

In another aspect of the invention, a method for communicating packet fragments over a multiple parallel asymmetric interface comprises the steps of coupling a first linking interface to a first computing device. The first linking interface transmits packet fragments from the first computing device at an up-link data transmission rate and receives packet fragments to the first computing device at a down-link data receiving rate. The up-link rate is greater than the down-link rate. The difference between the up-link rate and the down-link rate of the first linking interface defines a first linking difference. A second linking interface is coupled to the first computing device. The second linking interface receives packet fragments at a down-link data receiving rate and transmits packet fragments at an up-link data transmission rate. The down-link rate is greater than the up-link rate. The difference between the down-link rate and the up-link rate of the second linking interface defines a second linking difference. The second linking difference being generally equivalent to the first linking difference. A third interface is coupled to a second computing device. Packet fragments are transmitted from the first computing device. Up-linked packet fragments are transported to the third interface such that the third interface receives and down-links the transported packet fragments to the second computing device.

In another aspect of the invention, a multiple parallel asymmetric interface with reversed asymmetric links comprises a first asymmetric interface having an up-link data transmission rate and a down-link data receiving rate. The down-link rate is less than the up-link rate wherein a difference between the up-link rate and the down-link rate defines a first asymmetric difference. A second asymmetric interface has a down-link data receiving rate and an up-link data transmission rate. The up-link rate is less than the down-link rate wherein a difference between the down-link rate and the up-link rate defines a second asymmetric difference. The second asymmetric difference is generally equivalent to the first asymmetric difference.

In another aspect of the invention, an apparatus for symmetrically linking packet fragments comprises a first asymmetric linking interface having a plurality of first receiving channels for receiving packet fragments and a plurality of first transmitting channels for transmitting packet fragments. A second asymmetric linking interface has a plurality of second transmitting channels for transmitting packet fragments and a plurality of second receiving channels for receiving packet fragments. The plurality of first receiving channels and the plurality of second receiving channels define a receiving link having a down-link receiving rate. The plurality of first transmitting channels and the plurality of second transmitting channels define an up-link having an up-link transmission rate. The up-link rate generally equivalent to the down-link rate.

In still another aspect of the invention, a multiple parallel asymmetric interface with reversed asymmetric links comprises a computing device. A first asymmetric linking interface has a plurality of first receiving channels for receiving packet fragments to the computing device and a plurality of first transmitting channels for transmitting packet fragments from the computing device. A second asymmetric linking interface has a plurality of second transmitting channels for transmitting packet fragments from the computing device and a plurality of second receiving channels for receiving packet fragments to the computing device. The plurality of first receiving channels and the plurality of second receiving channels define a down-link having a down-link receiving rate. The plurality of first transmitting channels and the plurality of first transmitting channels defme an up-link having an up-link transmission rate, the up-link rate generally equivalent to the down-link rate.

These and many other features and advantages of the invention will become more apparent from the following detailed description of the preferred embodiments of the invention.

BRIEF DESCRIPTION OF THE DRAWINGS

Presently preferred embodiments of the invention are depicted in the drawings, wherein like reference numerals refer to like elements in the various views, and wherein.

DETAILED DESCRIPTION OF THE PREFERRED EMBODIMENTS

Figure 1:
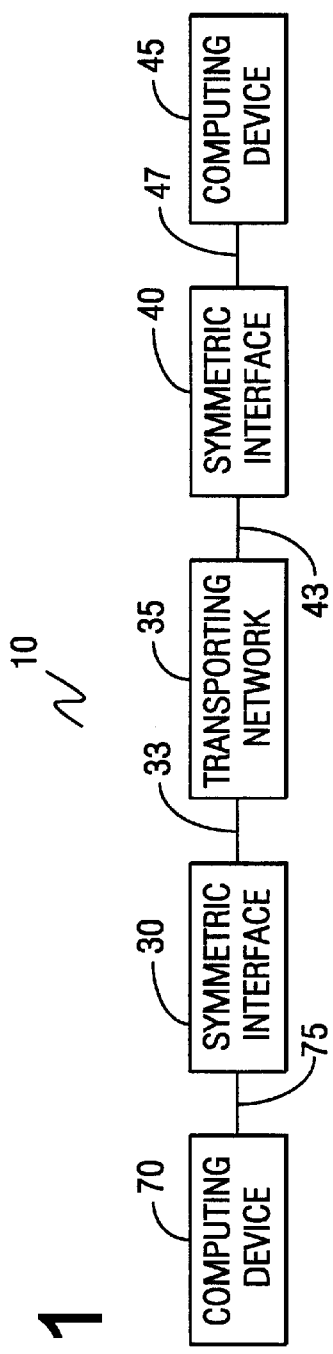
FIG. 1 illustrates a symmetric communication channel for communicating data packets between a first computing device and a second computing device and incorporating a preferred embodiment of the present invention.

FIG. 1 illustrates a symmetric communication channel 10 incorporating a preferred embodiment of the present invention. The channel 10 includes a first computing device 20, a first symmetric interface 30, a transporting network 35, a second symmetric interface 40, and a second computing device 45. The first computing device 20 runs an application that generates an output 25. The application can be a real time application such as one relating to Internet telephony, to streaming, to audio, to video, or to a combination multimedia application. Alternatively, the application can be a time insensitive application such as an e-mail, a spreadsheet, or a word processor application. Preferably, the application generates a stream of data packets comprising a stream of data packet fragments.

The first symmetric interface 30 up-links or transmits the output 25 as a stream of data packet fragments 33 to the transporting network 35. The second symmetric interface 40 receives a stream of transported data fragments 43. The stream of data fragments 43 received by the second symmetric device 40 may be different from the transmitted stream 33 since during transport the data packets may experience drop outs, delays, and other transporting errors that frequently occur during packet transport. A stream of data packets 47 is then down linked to the second computing device 45.

The communication channel 10 is directed towards implementation by way of a personal computer environment. In such an environment, the symmetric interfaces 30, 40 may be implemented via an adapter card to a computing device. Essentially, the computing devices 20, 45 may represent separate computers connected to a main computer via a bus network. Such a bus network could be ISA, EISA, PCI, Universal Serial Bus, CellBus, MVIP, SCSA or the like. ISA/EISA/PCI, Serial, Parallel, etc., are PC bus standards. SCSA and MVIP are card to card bus standards. Alternatively, a computing device and symmetric interface could be contained in one personal computer.

Similarly, second computing device 45 generates an output that is transmitted from the first computing device 20 to the transporting network 35 by the second symmetric interface.

Preferably, both the first symmetric interface 30 and the second symmetric interface 40 comprise a plurality of asymmetric data transmission links. These transmission links are operatively coupled to the computing device in either the forward and reversed direction. Preferably, the first symmetric interface 30 comprises multiple ADSL adapters. Some of the ADSL adapters are arranged in the user access mode while other adapters are arranged in the server access mode. As previously discussed, the stream of data packet fragments 33 is transported via the transporting network 35 between the first and second symmetric interfaces 30 and 40.

The transporting network 35 is a packet switched network and preferably an Internet. An Internet is one type of packet switched network: An Internet is a network of networks. The Internet is divided into thousands of autonomous systems ("AS") that are individual networks controlled by an administrative agency. The range of AS sizes can vary greatly. For example, a single company with a single Ethernet local area network ("LAN") is an AS. A large AS, such as a telephone company ATM backbone spanning the breadth of the United States is also an AS. Therefore, the term Internet, as that term is used herein, is a meta-network in that is a scheme for inter-connecting different AS's such that data can be transported between AS's. Currently, the Internet spans over 140 countries and includes approximately 13 million individual hosts. The term "host," as used herein, is a computing device or access point having a unique Internet Protocol (IP) address.

Alternatively, other types of AS's that can be used to transport the stream of data packet fragments between symmetric interfaces include any direct connect, packet or circuit switched network. Such topologies could include Leased Line, WANs, LAN, Internet, Intranet, etc. The transporting network 35 transports the stream of data packet fragments from the first processing interface 30 to the second interface 40.

Preferably, the first and second computing devices 20, 45 of system 10 are electronic communicating devices such as a host, server computer, concentrator, modem, facsimile machine, network computer, personal computer (PCs), pager, hand-held communicating device, personal assistant, laptop computing device, or the like.

Since the first and second computing devices 20, 45 can act as both transmitter and receiver of data packet information, an interactive communication environment requires bi-directional data transmission. In other words, devices 20, 45 must be able to transmit and receive data over their symmetric interfaces 30 and 40, respectively. Such an interactive communication environment is shown in FIG. 1.

Referring to FIG. 1, the first computing device 20 has been generally described as both a transmitter and a receiver of information. The first and second interface 30, 40 symmetrically up-link and down-link transported data packet information, i.e., the interfaces 30 and 40 up-link and down-link information at generally the same speed. To provide a more detailed discussion as to how the communication channel 10 symmetrically bi-directionally communicates data, data packet up-linking between the first computing device 20 and the first symmetric interface 30 will be discussed. It should be understood that up-linking between the second computing device 45 and the second symmetric interface 40 occurs in a similar manner.

Figure 2:
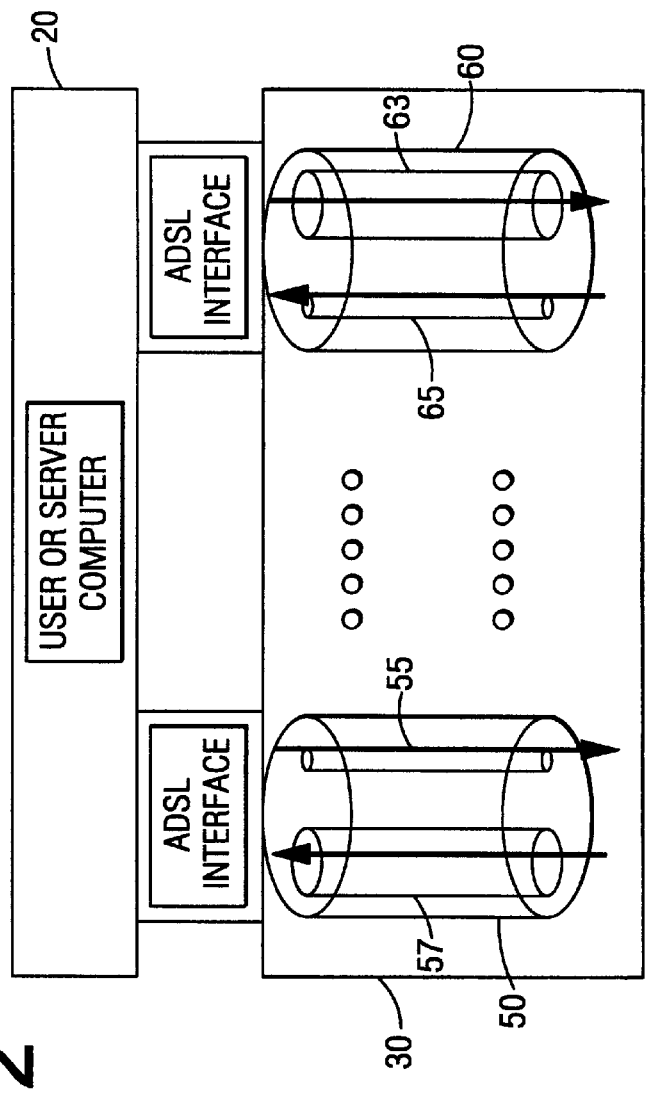
FIG. 2 illustrates the first asymmetric interface and the first computing device shown in FIG. 1.

FIG. 2 illustrates the first computing device 20 and the symmetric interface 30 both shown in FIG. 1. The symmetric interface 30 is operatively coupled to the first computing device 20. Symmetric interface 30 comprises a plurality of asymmetric interfaces. Symmetric interface 30 has an equal amount of up-link and down-link bandwidth and can therefore transmit and receive data at generally symmetric rates.

Each asymmetric interface has two data transmission channels or links. One of the transmission channels is an up-link utilized to transmit data. The other channel is a down-link utilized for receiving data. By definition, the transmission channels of an asymmetric interface are asymmetric, i.e., they have varying bandwidths. Therefore, depending on how an interface is coupled to a computer device, the interface will either have a faster or slower up-link rate relative to its down-link rate.

Preferably, the plurality of asymmetric interfaces are coupled to the computing device 20 such that the composite up-link rate of interface 30 is generally equivalent to the composite down-link rate of interface 30. The composite up-link rate is the total up-link bandwidth of all of the interface up-links. Similarly, the composite down-link rate is the total down-link bandwidth of all of the interface down-links. Preferably, the symmetric interface 30 comprises an even number of up-link and down-link channels coupled to the computing device 20. Alternatively, the symmetric interface comprises an odd number of up-link and down-link channels. For simplicity of this discussion, symmetric interface 30 comprises only a first asymmetric interface 50 and a second asymmetric interface 60 as shown in FIG. 2.

First asymmetric interface 50 has an up-link channel 55 and a down-link channel 57. The up-link channel 55 transmits or up-links data from the computing device 20. The down-link channel 57 receives or down-links data to the computing device 20.

The bandwidth of the channels 55 and 57 is schematically represented as proportional to the width of the channel. Therefore, first asymmetric interface 50 is coupled to computing device 20 such that the faster transmission channel is utilized as a down-link. The slower transmission channel is utilized as an up-link. Consequently, the first asymmetric interface 50 has a greater receiving bandwidth than transmitting bandwidth. This difference in up-link versus down-link bandwidth defines the asymmetric difference of the first asymmetric interface 50. Preferably, where the asymmetric interface is an ADSL device, the asymmetric difference is approximately equal to six (i.e., 640 kilobits in one direction versus 4 megabits in the opposite direction). Interface 50 therefore represents a user access based interface because it has a faster down-link than up-link rate.

Second asymmetric interface 60 has a similar structure to the structure of interface 50. Interface 60 comprises an up-link channel 63 and a down-link channel 65. The bandwidth of channels 63 and 65 is schematically represented by the width of the channel. Interface 60 is coupled to computing device 20 such that the faster transmission channel 63 is utilized as an up-link. The slower transmission channel 65 is utilized as a down-link. The transmitting channel 63 therefore has a greater bandwidth than the receiving channel 65. The asymmetric interface 60 can therefore up-link at a greater speed than the receiving channel 65 can down-link. The up-link versus down-link difference defines the second asymmetric difference. With respect to the first asymmetric interface 50, the second asymmetric interface 60 is reversed coupled to computing device 20.

Preferably, a plurality of even numbered asymmetric interfaces are coupled to the computing device 20 so that an even number of data links are operatively coupled to the computing device 20. By coupling a plurality of asymmetric interfaces, a symmetric interface having a generally equivalent amount of up-link and down-link bandwidth is configured. As long as the composite up-link rate is generally equivalent to the composite down-link rate, an odd or an even number of asymmetrical devices can be utilized.

Alternative asymmetric interface configurations may also be configured. For example, a first asymmetric interface having twice the up-link and twice the down-link speed of a second alternative interface can be coupled to a computing device. Two alternative interfaces may be reverse coupled to the computing device to configure a symmetric interface. Depending on the up-link and down-link rates of an interface, therefore, various alternative configurations can be used so long as the composite up-link bandwidth and composite down-link bandwidth of the interface are generally equivalent.

Computing device 20 transmits information over a plurality of operatively coupled up-links. For example, as shown in FIG. 2, computing device 20 transmits information at a fast rate over the fast up-link 63 and at a slower rate over the slow up-link 55. For example, for an ADSL based interface, the fast link 63 can transmit data at a rate of up to 4 megabits per second and the slow link 55 transmits data at a rate of up to 640 kilobits per second. The interface can transmit data packets over the fast link 63 approximately six times faster than it can transmit similarly sized data packets over the slow up-link 55.

Alternatively, various sized data packet fragments can be transmitted over the fast up-link 63 and the slow up-link 55. For example, if the fast up-link bandwidth is approximately six (6) times faster than the slow up-link bandwidth, six (6) equally sized packet fragments can be sent over the fast up-link 63 for every similarly sized data packet fragment transmitted over the slow link 55. In other words, an equal number of fragments on both types of links can be transmitted at approximately the same speed. However, the throughput over the fast link may be six times as high as the throughput over the slow link.

Computing device 20 also down-links data over both the fast down-link 57 and the slow down-link 65. Computing device 20 receives data over the fast down-link 57 at a fast speed and receives data over the slow up-link 65 at a slower speed. For example, in a ADSL based interface, the fast link 57 can receive data at a rate of up to 4 megabits per second and the slow link 65 can receive data at a rate of up to 640 kilobits per second. Data packets can therefore be up-linked over the fast link 63 approximately six (6) times faster than data packets up-linked over the slow up-link 55.

Alternatively, various sized data packet fragments can be received over the fast down-link 57 and the slow down-link 65. For example, if the fast down-link bandwidth was approximately six (6) times larger than the slow down-link bandwidth, six (6) equally sized packet fragments can be received over the fast down-link 57 for every similarly sized data packet fragment received over the slow down-link 65. In other words, an equal number of fragments could be received at approximately the same speed over both types of links. However, the throughput over the fast links could be six (6) times as high as the throughput over the slow links.

Slow-up link 55 and fast-up link 63 define an interface pair and fast-down link 57 and slow-down link 65 define another interface pair. These interface pairs and the computer device 20 shown in FIG. 2 can be utilized with various types of communications schemes or communications protocols for communicating over the ADSL. Such protocols can include protocols such as the Point to Point Protocol (PPP) with associated control, compression, authentication, and network protocols including the Multi-Link Point to Point Protocol (MLPPP), raw LAN (Ethernet or Token Ring) packets, HDLC and other like protocols. A preferred protocol is PPP with MLPP authentication, compression, control and network protocols as negotiated and/or required. This is a preferred protocol because it is a standard, it may be used for device interoperability, and is very robust.

In either case, since there are two symmetric link pairs, one could use either PPP over each symmetric link pair separately and therefore have two separate connections. Alternatively, MLPPP may be used, treating each symmetric link pair as one pair of links.

With the PPP Multi-link RFC 1990, the communication system 10 would first need to determine the up-link and down-link rates of each symmetric interface coupled to the computing device 20. After determining these rates, the system 10 would then allocate and then transmit equally sized data packet fragments over both the fast and slow up-links of the symmetric interface. The fast up-links would transmit a greater number of equally sized data packet fragments than the slow up-links. Alternatively, larger data packets could be transmitted over the faster links than over the slower links. In either case, the communication system 10 would perform a similar data packet fragment receiving and allocation scheme when down-linking information. In either case, the transmission over the slow links could be avoided.

Preferably, the communication channel transmits and receives most data over the fast links of the symmetric interfaces. For example, data packet transmission retries would be sent only over the fast up-links at both the transmitting and receiving end of the communication channel. In addition, data transmission feedback or receipt acknowledgments would be sent only over the fast links at both the transmitting and receiving end of the communication channel. In either the case of retries or acknowledgments, transmission and reception over the fast links avoids a delay at the receiving end of the communication channel.

Various types of data transmission allocation schemes can be utilized to transit and receive data packets over the communication channel 10 shown in FIG. 1. In one preferred scheme, prior to fragment transmission, the system allocates the data packet fragments to a queue. A larger number of fragments are transmitted over a transmission link having a greater bandwidth. Fewer fragments are sent over another transmission link having a lower bandwidth. For example, returning to the symmetric interface 30 shown in FIG. 2 and assuming a data communication scheme utilizing uniform sized data packet fragments, a greater number of similarly sized fragments could be transmitted over the fast transmitting channel 63 than over the slower transmitting channel 55. Similarly, when down-linking data packet fragments, the computing device 20 could receive a greater number of fragments over the faster receiving channel 57 than over the slower receiving channel 65.

Figure 3:
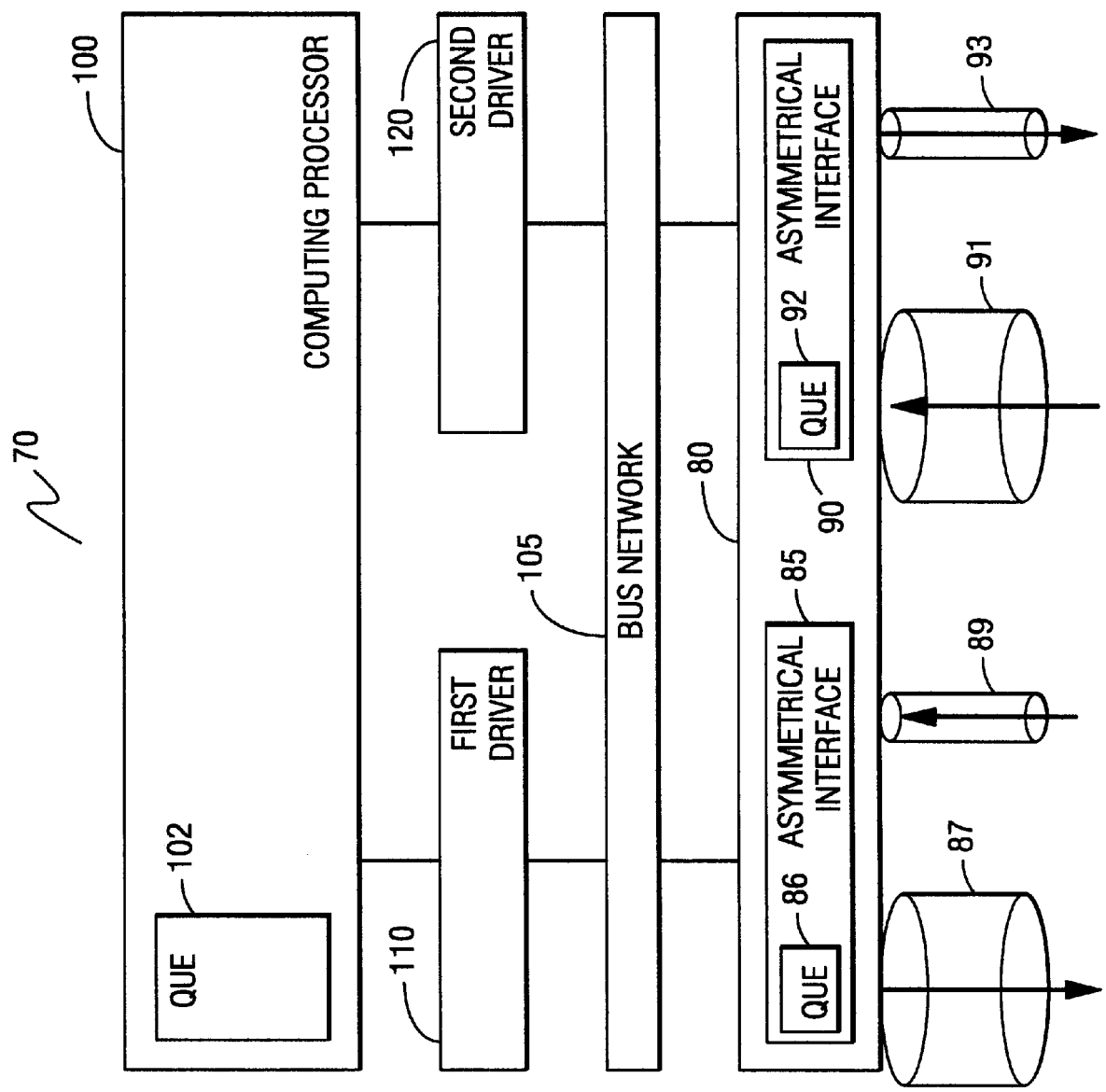
FIG. 3 is a block diagram illustrating a system for allocating data packet fragments communicated over the communication channel shown in FIG. 1.

FIG. 3 is a block diagram illustrating a system 70 for communicating data packet fragments over the communication channel 10 shown in FIG. 1. The system 70 includes a computing processor 100 operatively coupled to a first driver 110 and a second driver 120. The first and second drivers 110 and 120 are coupled by a bus 105 to a symmetric linking interface 80. The processor 100 processes a first queue 102 of data packets generated by an application. The data packet fragments are then transmitted over the symmetric interface 80.

Symmetric interface 80 comprises a plurality of asymmetric interfaces. Preferably, the symmetric interface 80 comprises a plurality of asymmetric interfaces as previously described with respect to FIG. 2. For simplicity of discussion, the symmetric interface 80 shown in FIG. 3 comprises only a first and a second asymmetric linking interface 85 and 90, respectively. Of course, alternative asymmetric interface configurations can comprise a plurality of asymmetric devices. In these alternative embodiments, each asymmetric interface will be operatively coupled to a separate driver. These various alternative embodiments can be utilized to comply with the PPP Multi-link standard as long as the composite up-link rate of the symmetric interface is generally equivalent to the composite down-link rate. With reference to symmetric interface 80 shown in FIG. 3, the composite up-link rate is generally equivalent to the composite down-link rate.

As shown in FIG. 3, the first asymmetric interface 85 comprises a queue 86, an up-link channel 87, and a down-link channel 89. The asymmetric interface 85 is operatively coupled to the processor 100 such that the up link channel 87 has a fast up-link speed. Preferably, the interface 85 is coupled by the bus network 105 and the first driver 110. Consequently, asymmetric device 85 has a receiving channel 89 having a slower down-linking speed. The first asymmetric interface 85 therefore has a greater up-link rate than down-link rate. The difference between the interface up-link rate and the interface down-link rate defines the asymmetric difference of the interface 85. The bus network 105 could be ISA, EISA, PCI, Universal Service Bus, CellBus, MVIP, SCSA, or other like bus networks.

The configuration of the second asymmetric interface 90 is similar to the configuration of the first asymmetric interface 85. Interface 90 comprises a queue 92, an up-link channel 93, and a down-link channel 91. Interface 90 is operatively coupled to the processor 100 such that the down-link 91 has a fast down link rate. Consequently, asymmetric interface 90 has a transmitting channel 93 having a slower up-link rate. The second asymmetric interface 90 has a greater data link rate then up-link rate and is therefore observed to be configured as a reversed asymmetric link with respect to the first asymmetric interface 85. The difference between the down-link and the up-link rates of asymmetric interface 90 defines the asymmetric difference of the interface 90.

The system 70 transmits data packets in the following manner. The processor 100 receives a stream of data packet fragments. The stream is generated by an application. Preferably, the application generates real time data information. Processor 100 processes a queue 102 of the data packet fragments. For simplicity, rather than discuss both the transmission and receiving of the stream of data packets, only data transmission will be discussed.

Because the transmission bandwidth of the symmetric interface 80 varies, the processor 100 determines the data transmission rates of each up-link channel. For example, even though the physical amount of bandwidth is fixed, i.e. 640 kilobytes, the effective throughput may differ due to timing constraints and other factors. Preferably, the processor 100 determines the individual transmission rates of each up-link and down-link channel.

Alternatively, the transmission rates of the up-link channels 87, 93 can be determined automatically by the first and the second drivers, 110 and 120 respectively. Drivers 110 and 120 transfer data to and from the interfaces 85 and 90 and the host processor 100. They can also be responsible for implementing the communication scheme for both hardware and software. Alternatively, the data transmission rates are determined via the hardware configuration.

The processor 100 maintains the data packet fragments within queue 102. The processor allocates these data packet fragments according to the transmission rates of the transmission channels making up the symmetric interface 80. In the case where the data fragments are uniform in size, the processor allocates more packets to the fast up-link than to the slow down-link. With respect to the symmetric interface shown in FIG. 3, the processor 100 sends a different rate of data to the fast up-link queue 86 than to the slow up-link queue 92. This difference in data transmission rates attempts to ensure that the respective interface queues 86 and 92 are generally equivalent in size. The allocation scheme monitors the rate of sending information over the slower up-link 93 such that it will not cause delays in the overall performance of the system 70.

The processor 100 receives feedback from both the first driver 110 and the second driver 120. The processor 100 utilizes this feedback to update its estimate as to how much data is in queue 86 and in queue 92. The drivers also determine the transmission rates of the up-links. The transmission rates may be determined from information gathered from PPP negotiation.

The drivers also monitor the depth of the asymmetric interface queues. For example, driver 110 monitors the depth of queue 86 of first asymmetric interface 85. Driver 110 can then inform processor 100 of the current depth of queue 86. With this information, processor 100 updates the original depth of queue 102. Processor 100 can then remove any skew in queue depth that may have developed between the actual depth of queue 86 and the depth that the processor 100 thought queue 86 was in. The second driver 120 performs a similar monitoring function with respect to queue 92 of the second asymmetric device 90. Alternatively, where an asymmetric interface comprises more than two asymmetric interfaces, a plurality of drivers are provided. Each driver monitors a separate interface.

The first asymmetric interface 85 maintains its queue 86. As the processor 100 allocates data packet fragments to interface 85, the first interface 85 places these data packet fragments into queue 86. These allocated data packet fragments are then transmitted by the up-link 87 over a line. The second asymmetric device 90 performs a similar allocation function with respect to its queue 92.

In an alternative embodiment, an asymmetric interface comprises a plurality of queues. Preferably, each asymmetric interface queue stores data of a specific class of service. For example, an asymmetric interface may have two (2) different queues. If an application generates a data stream containing two classes of service, e.g., audio and data, a processor allocates both classes of service to the asymmetric interface. The audio data packet fragments will be allocated to the first asymmetric interface while the data packet fragments will be allocated to the second queue. Based on the priority of a class of service, those classes of service having the highest priority will be transmitted first. For example, where the asymmetric interface stores audio and data information, the audio data packet information would be transmitted over the fast up-link first.

Figure 4:
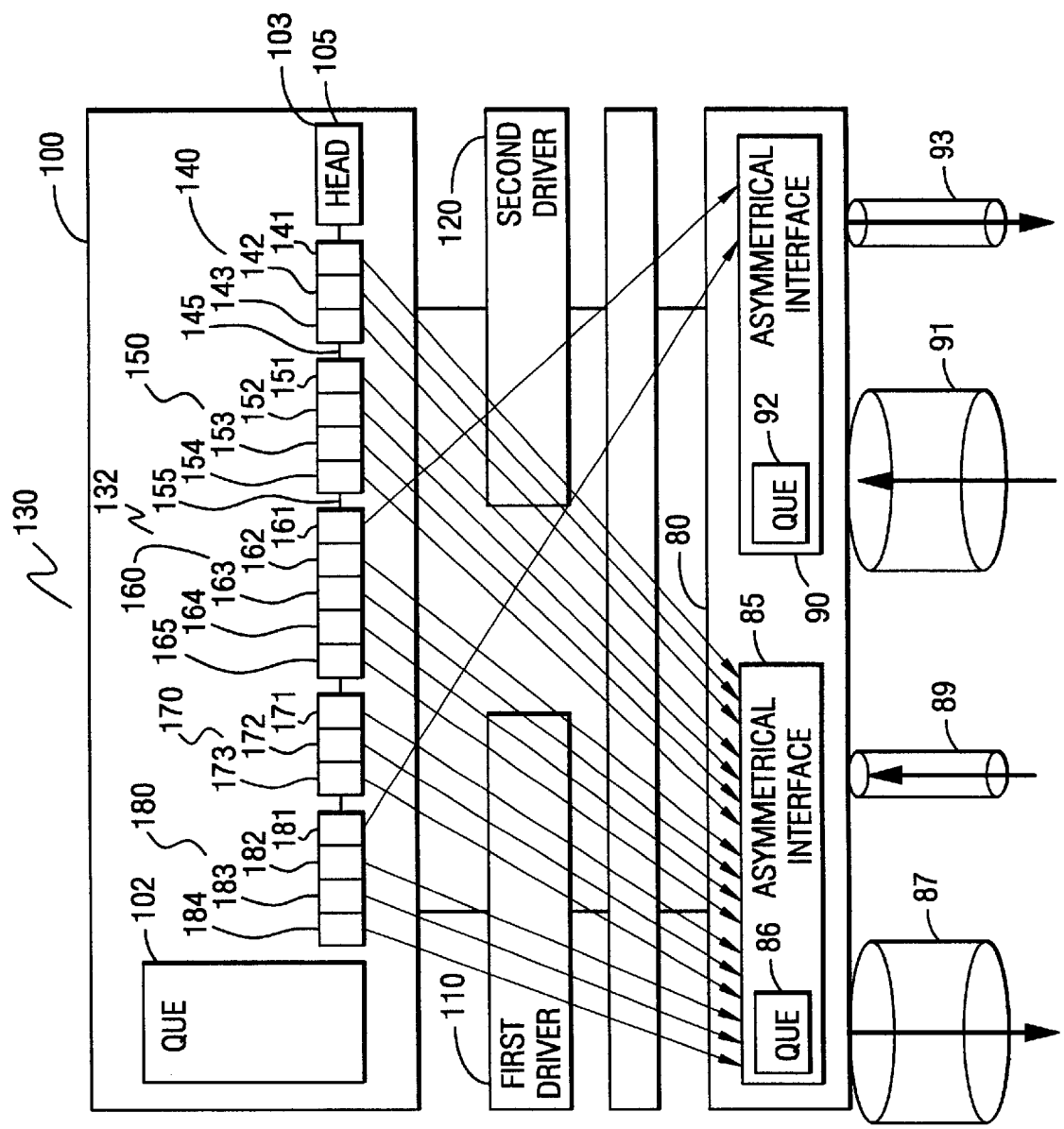
FIG. 4. is a block diagram illustrating an allocation scheme for the data packet fragments communicated by the system shown in FIG. 3.

FIG. 4 is a block diagram illustrating a data packet fragment allocation scheme 130 for the system shown in FIG. 3. In scheme 130, a computing device uses an application to generate a stream of data packets 132. The stream 132 is to be transmitted over symmetric interface 80. The stream 132 comprises a header 105 and five (5) data packets 140, 150, 160, 170, and 180. Header 105 is used by upper layer protocols for transmission of the application data from one end of a communication channel to the other end. This is in contrast to the communications protocol that is concerned with reliable communication of the "data" over the physical network. The data can be encapsulated in any standard IP, IPX or Netbeui frame.

Each data packet comprises a plurality of data packet fragments. For example, the first data packet 140 (i.e., Pkt#1), comprises three (3) equally sized data packet fragments 141, 142, and 143. The second data packet 150 (i.e., Pkt#2) comprises four (4) equally sized data packet fragments 151, 152, 153, 154 and 155. All of the data packets comprising the data packet stream 132 are essentially the same size and are allocated to the queue 102. As previously described with reference to FIG. 2, the processor 100 maintains the queue 102 of data packet fragments.

Header 105 and data packets 140, 150, 160, 170 and 180 are stored in queue 102. The arrangement of the header 105 and data packets vis-à-vis one another is a function of the application generating the stream 132. If a computing device uses an application to generate a real time data packet stream, various delays may be interspersed between data packets. Delays can be induced based upon numerous factors including speed of processor 100, the fact that other applications are running on the machine and therefore consuming resources, and delays encountered by the application in gathering data from its source.

In the example shown in FIG. 4, the stream 132 has a number of delays interspersed between various data packets. For example, the application initiates a first delay 145 between first data packet 140 and second data packet 150. Similarly, the application initiates a second delay 155 between second data packet 150 and third data packet 160. No delay is initiated between the third data packet 160 and fourth data packet 170 or between the fourth data packet 170 and the fifth data packet 180. It is assumed, for the convenience of this explanation, that prior to transmitting the first data packet 140, the queues 102, 86, and 92 are all empty. It is also assumed that the asymmetric difference between the fast and slow links of symmetric interface 80 is four (4).

The transmission scheme 130 shown in FIG. 4 transmits uniform data packet fragments. Scheme 130 allocates uniformly sized packet fragments to the symmetric interface 80 for transmission over up-links 87 and 93. This allocation scheme can be demonstrated by the allocation of the stream of data packets 132 shown in FIG. 4.

As shown in FIG. 4, the first data packet 140 comprises three (3) equally sized data packet fragments 141, 142, and 143. Since the differential rate between the fast up-link 87 and the slow up-link 93 is assumed to be four (4), the first three packet fragments 141, 142, and 143 are all allocated to queue 86. These fragments are then transmitted over the fast up-link 87. If one of the data packet fragments of data packet 140 were allocated to queue 92 for transmission over the slow up-link 93, the delay in transmitting this fragment would cause the entire data packet 140 to wait at a receiving end until any slowly transmitted fragment was received. By allocating the three data packet fragments 141, 142, and 143 to the fast up-link 87, no further delay is incurred in the transmission of the first data packet 140.

After allocating the three (3) data packet fragments of the first data packet 140, a delay 145 is initiated. During delay 145, queue 86 of first asymmetric interface 85 can empty. Queue 86 is now prepared to receive additional data packet fragments for transmission.

As long as a delay is initiated after four or less fragments are allocated to the fast up-link queue 86, the previous four data fragments are allocated to the fast up-link queue 86. Therefore, delays associated with transmitting data packet fragments over the slow up-link 93 may be avoided. If in an alternative embodiment the differential rate between the fast up-link 87 and the slow up-link 93 is five (5), the first five packets of a data packet would be all allocated to queue 86.

The four data packet fragments 151, 152, 153 and 154 making up the second data packet 150 are allocated to the now empty queue 86 of first asymmetric interface 85. These four data packet fragments are then transmitted over the fast up-link 87. Again, since the asymmetric difference of interface 85 is assumed to be four (4), all four fragments 151, 152, 153, and 154 are allocated to the first asymmetric interface 85 because of its fast up-link rate. Again, a delay 155 is generated following the transmission of second data packet 150. During delay 155, queue 86 of asymmetric device 85 can empty after transmission of its previously allocated contents, i.e., data packet fragments 151, 152, 153, and 154.

The third data packet 160 comprises five (5) data packet fragments 161, 162, 163, 164, and 165. First fragment 161 is allocated to the slow up-link queue 92. The remaining four data packets 162, 163, 164, and 165 are then allocated to the fast up-link queue 86. By transmitting the first fragment 161 over the slow up-link, the remaining four packet fragments 162, 163, 164, and 165 of data packet 160 will not have to wait at the receiving end of the communication channel since the up-link differential is four (4). Alternatively, had the up-link differential rate been five (5), all five data packets 161, 162, 163, 164, and 165 comprising the third data packet 160 would have been allocated to the fast up-link queue 87.

No delay is initiated between the third data packet 160 and fourth data packet 170. In addition, no delay is initiated between the fourth data packet 170 and the fifth data packet 180. The fourth data packet 170 comprises three data fragments 171, 172, and 173. These three fragments are all allocated to queue 86 for transmission over the fast up-link 87. If a delay were initiated between the fourth 170 and fifth data packet 180, queue 86 would be able to empty and then all four of the fragments of the fifth packet 180 would be allocated to the fast up-link queue 86. However, since no delay is initiated between the two data packets 170 and 180, the fast up-link queue does not have the opportunity to empty before the next allocation of data packet fragments. Consequently, the first fragment 181 of the fifth packet 180 is allocated to the slow up-link 93. This enables the first fragment 181 to arrive at a receiving end at approximately the same time as the remaining three fragments 182, 183, and 184 of the fifth packet 180.

The queuing scheme 130 illustrated in FIG. 4 can be applied to both delay insensitive as well as delay sensitive information. For example, queuing scheme 130 can be utilized for transmitting data packet information generated by delay sensitive real time applications such as Internet telephony, video or streaming. Alternative queuing and allocation schemes can also be utilized for transmitting data packet information generated by delay sensitive applications.

Figure 5:
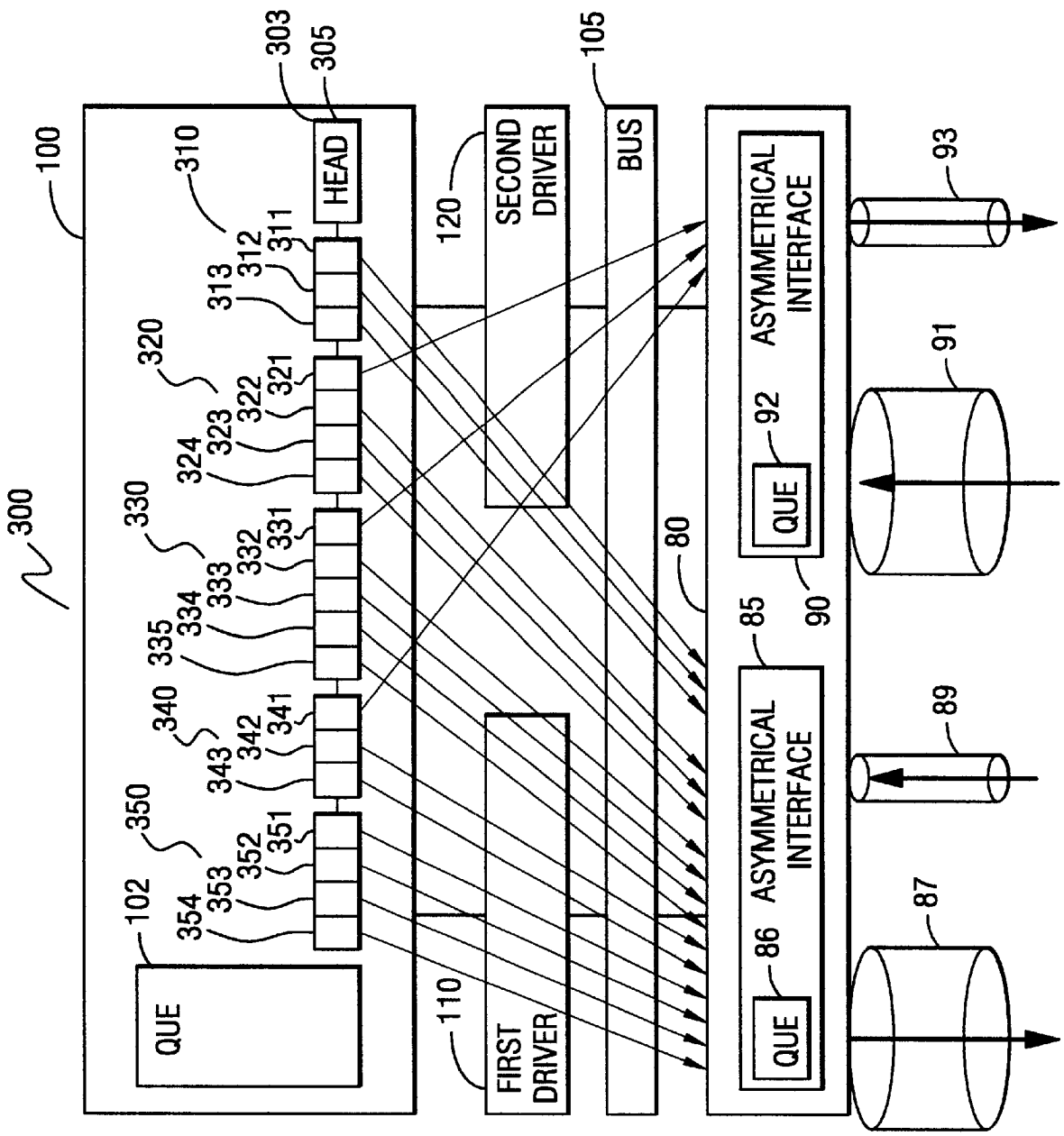
FIG. 5 is block diagram illustrating an alternative allocation scheme for the data packet fragments communicated by the system shown in FIG. 3.

FIG. 5 is a block diagram illustrating an alternative allocation scheme 300 for communicating data packet fragments over the communication channel 10 shown in FIG. 1. Scheme 300, which is suitable for both delay sensitive and insensitive information, utilizes the system shown in FIG. 3. In scheme 300, a computing device runs an application that generates a stream of data packets 303. The stream 303 comprises a header 305 and five (5) data packets 310, 320, 330, 340, and 350. Each data packet comprises a plurality of equally sized data packet fragments. The application does not initiate a delay between any of the data packets 310, 320, 330, 340, or 350.

All five data packets are allocated simultaneously in time at time equals $T_0$. The three fragments 311, 312, and 313 representing the first data packet 310 are allocated to the fast up-link queue 86. Since no delay occurs between the data packets 310 and 320 and since data packet 320 comprises more than three data packet fragments, the first fragment 321 of packet 320 is allocated to the slow up-link queue 92. In this manner, data packet 320 does not experience any additional delay at a receiving end of the communication channel. In an alternative embodiment where the up-link rate differential between the fast up-link 87 and the slow up-link 93 is five (5) or greater, the first fragment 321 would be allocated to the fast up-link 87.

Again, the fast up-link queue 86 cannot empty since no delay is initiated after the second data packet 320. The third data packet 330 comprises five data packet fragments 331, 332, 333, 334, and 335. Because of the up-link rate differential of the interface 80 is assumed to be four in this example, the first data packet fragment 331 is allocated to the slow up-link queue 92. The subsequent four data fragments are allocated to the fast up-link queue 86. In this manner, transmitting the first fragment 331 over the slow up-link 93 creates no additional delay in the reception of the third data packet 330. This is true since the slow up-link 93 can transmit the fragment 331 as fast as the fast up-link can transmit the four data fragments 332, 333, 334, and 335.

In general, the generated data stream is queued based upon the data type and the data priority. For example, time insensitive or low priority traffic or protocol signaling could be sent or received over the slow up link 89 or 93. Correspondingly, time sensitive or large bandwidth data could be sent or received over the higher bandwidth up link 87 or 91. Low priority data could include, by way of example, electronic mail. High priority data, by way of example, may include real time applications such as video conferencing. The priority determination could be achieved by interrogating the type of data, the user configuration of the data priorities, or through the use of a high layer protocol such as RTP.

Figure 6:
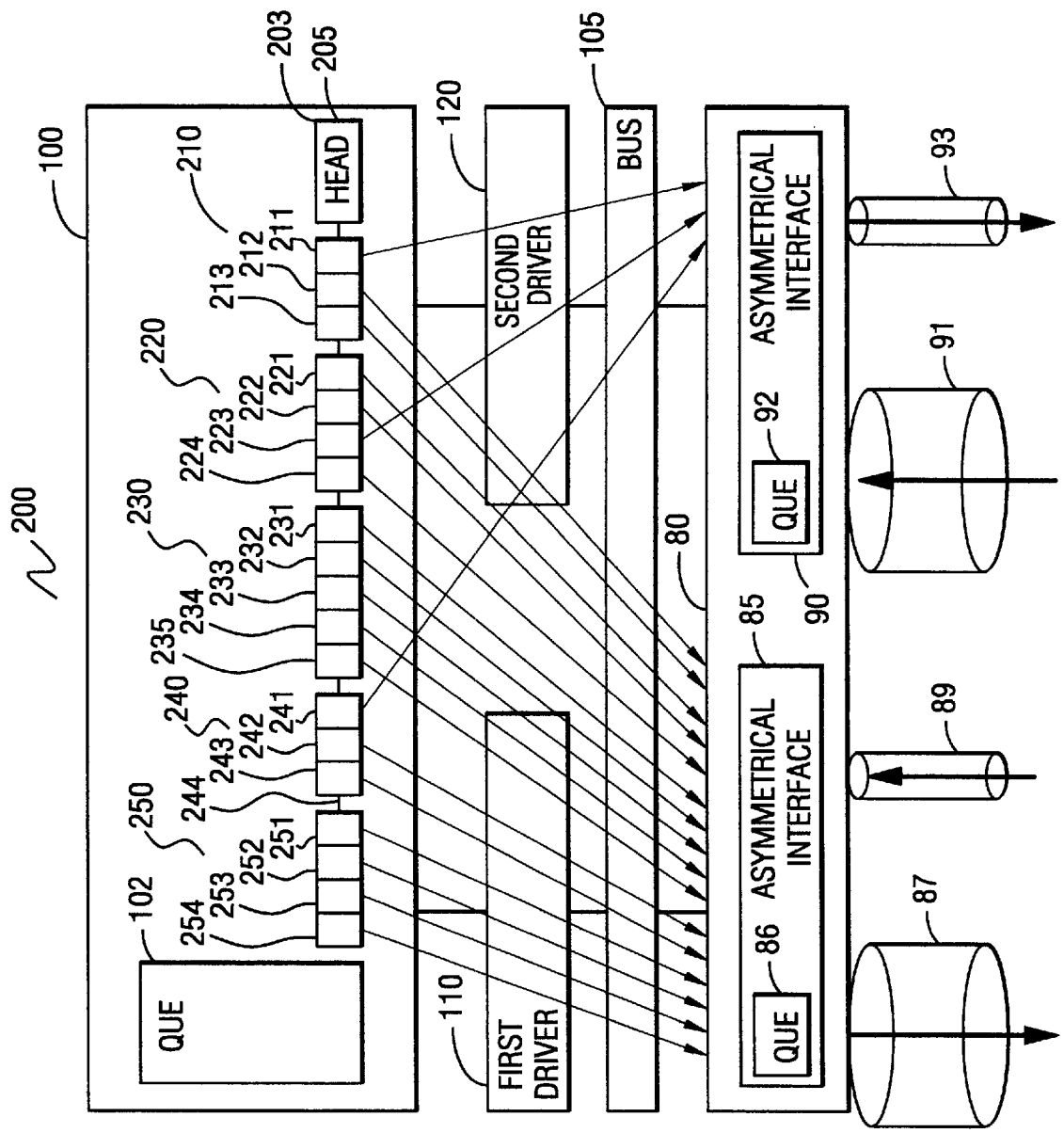
FIG. 6 is block diagram illustrating an alternative allocation scheme for the data packet fragments communicated by the communication system shown in FIG. 3.

For example, FIG. 6 is a block diagram illustrating an alternative allocation scheme 200 for communicating data packet fragments over the communication channel shown in FIG. 1. Scheme 200 is suitable for delay sensitive and insensitive information. The scheme shown in FIG. 6 utilizes a system similar to the system shown in FIG. 3. With reference to FIG. 6, a computing device runs an application that generates a stream of data packets 203. The stream 203 comprises a header 205 and five (5) data packets 210, 220, 230, 240 and 250. Each data packet comprises a plurality of uniformly sized data packet fragments. For example, the first data packet 210 comprises three uniformly sized fragments 211, 212, and 213. Similarly, the second data packet 220 comprises four uniformly sized data fragments 221, 222, 223 and 224, and the third data packet 230 comprises five uniformly sized fragments, 231, 232, 233, 234 and 235. Because the data packet stream 203 represents delay sensitive information, the application initiates no delays between any of the five data packets. Again, it is assumed that immediately prior to data packet fragment allocation, the system queues 102, 86, and 92 are empty. It is also assumed that the up-link rate differential for symmetric interface 86 is a four (4).

Generally, scheme 200 allocates a first data packet for transmission over the slow up-link and then allocates the subsequent four (4) data packets for transmission over the fast up-link 87. For example, the first data packet fragment 211 of the first data packet 210 is allocated to the slow up-link queue 92. The subsequent four data fragments are then allocated to the fast up-link queue 86. Therefore, the two remaining data packets 212 and 213 of the first data packet 210 and the first and the second data packet fragment 221, 222 of the second data packet 220 are allocated to the fast up-link queue 87.

The scheme 200 repeats the pattern of allocating a first fragment to the slow up-link queue 91 and then the next four fragments to the fast up-link queue. Therefore, the first three fragments 231, 232, and 233 of the third data packet are allocated to the fast up-link queue. Since the fourth fragment 223 is transmitted to queue 91, the next four fragments 235, 241, 242, and 243 are all allocated to fast up-link queue 87. This allocation scheme is then repeated until all of the data packet fragments of stream 203 have been allocated.

Alternatively, the scheme 200 can allocate and transmit data packet fragments utilizing other up-link rate differentials. For example, if the differential up-link rate is five (5), then an alternative scheme would allocate a first fragment to the slow up-link queue 92. The alternative scheme would then allocate the next five fragments to the fast up-link queue 86. This process of allocation would then be repeated for the remainder of the data packet stream to be transmitted.

Figure 7:
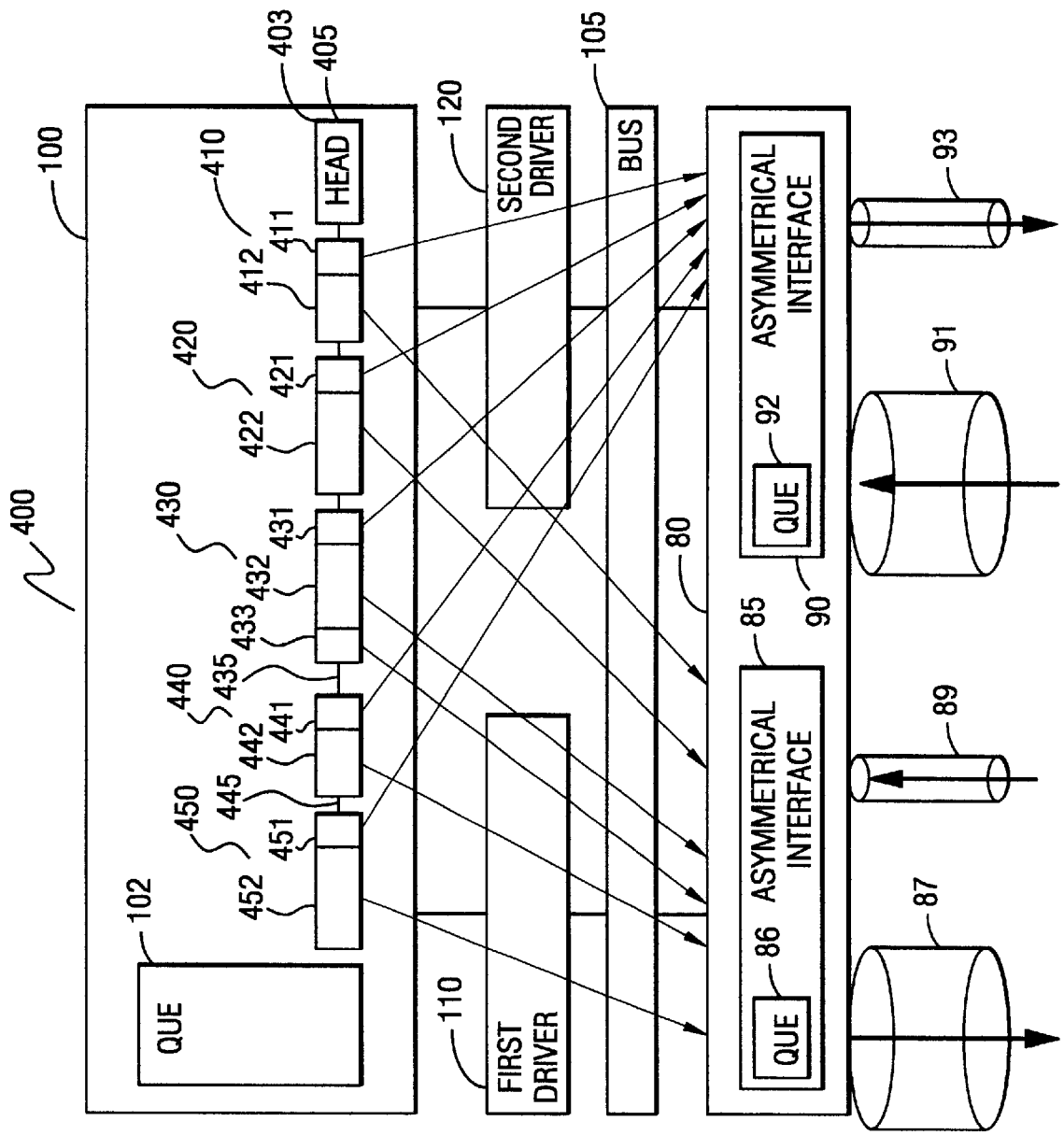
FIG. 7 is block diagram illustrating still another alternative allocation scheme for the data packet fragments communicated by the communication system shown in FIG. 3.

FIG. 7 is a block diagram illustrating an alternative allocation scheme 400 for communicating data packet fragments over the communication channel 10 shown in FIG. 1. Scheme 400 utilizes a similar system as shown in FIG. 5 and as described with reference to FIG. 3. Unlike the previous schemes discussed with reference to FIGS. 4, 5, and 6, however, scheme 400 allocates and transmits data fragments of varying sizes. Again, for ease of discussion, only two asymmetric interfaces 85 and 98 are shown in FIG. 7. It is also assumed that the up-link differential is generally equal to four (4).

With reference to FIG. 7, a computing device runs an application that generates a stream of data packets 403. The stream 403 comprises a header 405 and five (5) data packet fragments 410, 420, 430, 440, and 450. The application initiates no delay between the first data packet 310 and the second data packet 320. Similarly, no delay is initiated between the second data packet 320 and the third data packet 330. However, a delay 435 is initiated between the third data packet 430 and the fourth data packet 440. A delay 445 is also initiated between the fourth data packet 440 and the fifth data packet 450.

The stream 403 comprises data packets having various sized data packet fragments. Preferably, in this embodiment, data packets 410, 420, 430, 440, and 450 are made up of a small and a large sized fragments. More preferably, all the small sized fragments are uniform in size and all large fragments are uniform in size. The larger fragments are allocated for transmission over the fast up-link queue 87. The smaller fragments are allocated generated for transmission over the slow up-link 91. Preferably, the difference in size between the large and small fragments is generally proportional to the differential transmission rate. For example, where the differential up-link rate is four (4), the large data packet fragments will be generally no larger than two (2) times as large as the small data fragments.

In some circumstances, the difference in size between the large and the small fragments will be less than the differential transmission rate. For example, where the differential up-link rate is four (4), the large data packet fragments will be generally no larger than four (4) times as large as the small data fragments.

The allocation of the varying sized data packet fragments can occur as follows. As shown in FIG. 7, the first data packet 410 comprises two data fragments: a small fragment 410 and a large fragment 420. Because of the small size of data packet 410, the relative difference in size between the larger fragment 412 and the small fragment 411 is less than four (4). The small fragment 411 is allocated to the slow up-link queue 92 for transmission over the slow up-link 91. The large fragment 412 is allocated to the fast up-link queue 86 for transmission over the fast up-link 87. Because the scheme 400 is assumed to have a differential up-link rate equal to 4, the small fragment 411 can be transmitted over the slow up-link 91 at generally the same speed as the larger fragment 412 transmitted over the fast up-link 87. Since no delay is initiated after the first data packet 410, neither queue 92 nor queue 86 has time to transmit its contents.

The second data packet 420 comprises a small data packet fragment 421 and a large data packet fragment 422. The small fragment 421 is allocated to the slow up-link queue 92 for transmission over the slow up-link 91. The small fragment 421 is relatively the same size as the small data packet fragment 411 of the first data packet 410.

The remainder of second data packet 420 is packet into a large data packet fragment 422 and is allocated to the fast up-link queue 86 for transmission over the fast up-link 87. Because of the relative size of the second data packet 420, the large fragment 422 can be seen to be larger than the large fragment 412 of the first data packet 410. As long as the difference in size between a large fragment 422 and small fragment 421 is less than or equal to the up-link rate differential of four (4), the large fragment 422 will be allocated to the fast up-link queue 86. Therefore, the large fragment 422 is allocated to the fast up-link queue 86.

Alternatively, had the remainder of the second data packet 420 been more than four times larger than the small fragment, the remainder would have been segmented into further fragments. This can be seen to be the case with respect to the third data packet 430.

The third data packet 430 comprises three data packet fragments: a first small fragment 431, a large fragment 432, and a second small fragment 433. The first small fragment 431, which has the same relative size as fragments 411 and 421, is allocated to the slow up-link queue 86. Because the remainder of the third data packet 430 is four times larger than the small fragment 431, the remainder is segmented into more than one fragment. The remainder of the third data packet therefore comprises the large fragment 432 and the small fragment 433. The large fragment 432 is allocated to the fast up-link queue 92. The large fragment 432 is the same relative size as large fragment 422.

The small fragment 433 is allocated to the fast up-link queue 86. Fragment 433 is allocated to the fast up-link 86 since it is the last segment of the third packet 430. Allocating fragment 433 to the slow up-link queue 92 would cause the third packet 430 to be delayed at the receiving end of a communication channel.

A delay 435 is initiated after the allocation of the third packet 430. Therefore, both queues 92 and 86 can empty. The allocation of the fourth data packet 440 is similar to the allocation of the first data packet 410. Fourth data packet 440 comprises a small fragment 441 and a large fragment 442. The small fragment 441 is allocated to the slow up-link 92 and the large fragment is allocated to the fast up-link 86. After allocation of the fourth data packet 440, the application initiates another delay 445.

Fifth data packet 450 comprises a small data fragment 451 and a large data fragment 452. Allocation of the fifth data packet 450 is similar to the allocation of the second data packet 420. The first fragment 451 of the fifth data packet 450 is allocated to the slow-up link queue 92. The large fragment 452 is allocated to the fast up-link queue 86.

Figure 8:
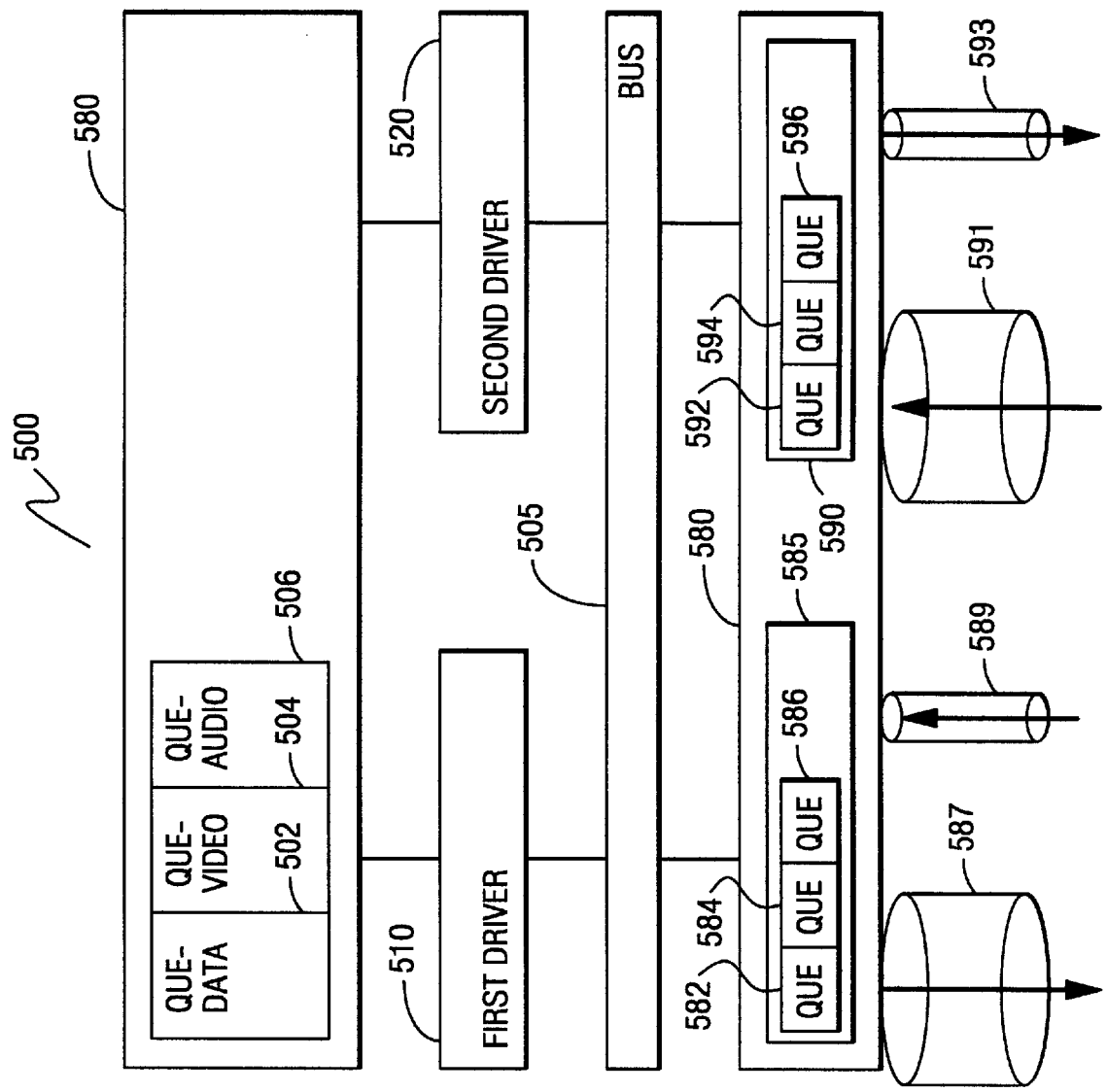
FIG. 8 is a block diagram illustrating an alternative allocating scheme for the data packet fragments communicated over the communication channel shown in FIG. 1.

FIG. 8 is a block diagram illustrating an alternative allocating system 500 for allocating data packet fragments communicated over the communication channel 10 shown in FIG. 1. The system 500 includes a processor 580 operatively coupled to a first driver 510 and a second driver 520. The first and second drivers 510 and 520 are coupled to a symmetric linking interface 580 by way of bus interface 505. The processor 580 maintains a plurality of queues for storing data. Preferably, the processor maintains three queues wherein each queue is dedicated to a specific class of information. For example, as shown in FIG. 8, the processor 580 maintains a first queue 502, a second queue 504, and a third queue 506. The first queue 502 is dedicated to storing data. The second queue 504 is dedicated to storing video and the third queue 506 is dedicated to storing audio. Each queue has a priority associated to its class of service. Data packet information is allocated for transmission based on a queue's priority. The processor 508 allocates each class of data independently from one another.

A computing device runs an application that generates a stream of data packets. Depending on the class of service of a data packet, the processor 508 allocates the data packets to the first queue 502, the second queue 504, and the third queue 506 containing various data packets. These various data packets can represent a single stream of data packets generated by a single application. Alternatively, these various data packets can represent various streams of data packets generated by a plurality of applications. The data packet fragments are then allocated to a respective queue contained in the symmetric interface 580.

Symmetric interface 580 comprises a plurality of asymmetric devices. Preferably, the symmetric interface 580 comprises a plurality of asymmetric devices as previously described with respect to FIG. 2. For simplicity of discussion, the symmetric interface 580 shown in FIG. 8 comprises only a first and a second asymmetric linking interface 585 and 590, respectively. Of course, alternative asymmetric interface configurations can comprise a plurality of asymmetric devices. In these alternative embodiments, each asymmetric interface will be operatively coupled to a separate driver. These various alternative embodiments can be utilized to comply with the PPP Multi-link standard as previously discussed so long as the composite up-link rate of the symmetric interface is generally equivalent to the composite down-link rate. The composite up-link rate of symmetric interface 580 is generally equivalent to the composite down-link rate.

As shown in FIG. 8, the first asymmetric interface 585 has a first queue 582, a second queue 584, a third queue 586, an up-link channel 587, and a down-link channel 589. The asymmetric interface 585 is operatively coupled to the processor 508 such that the up link channel 587 has a fast up-link speed for up-linking data packets. Consequently, asymmetric device 585 has a receiving channel 589 having a slower down-linking speed for down-linking data packets. The first asymmetric interface 585 therefore has a greater up-link rate than down-link rate. The difference between the interface up-link rate and the interface down-link rate defines the asymmetric difference of the interface 585.

The configuration of the second asymmetric interface 590 is similar to that of the first asymmetric interface 585. Interface 590 has a first queue 592, a second queue 594, a third queue 596, an up-link channel 593, and a down-link channel 591. Interface 590 is operatively coupled to the processor 500 such that the down link channel 591 has a fast down link rate for receiving data packet fragments. Consequently, asymmetric interface 590 has a transmitting channel 593 having a slower up-link rate for transmitting data packet fragments. The second asymmetric interface 590 has a greater data link rate then up-link rate and is therefore observed to be configured as a reversed asymmetric link as compared to the first asymmetric interface 585. The difference between the down-link and the up-link rates of asymmetric interface 590 defines the asymmetric difference of the interface 90.

The system 500 transmits data packets in the following manner. The processor 500 receives a stream of data packet fragments. The stream is generated by an application that can be either a delay sensitive or insensitive. Processor 500 processes the first queue 502, the second queue 504, and the third queue 506 of data packet fragments. For simplicity, rather than discuss both data transmission and data receiving, only data transmission is discussed. Because the transmission bandwidth of the symmetric interface 580 varies, the processor 508 determines the data transmission rates of each up-link channel. The data transmission rate determination fluctuates because of the fast link interface 587 and the slow link interface 593. Since these link speeds differ, the overall data transmission rate is not constant for interface 580. Preferably, the processor 508 determines the individual transmission rates of each up-link and down-link channel.

The transmission rates of the up-link channels 587, 593 can be determined automatically by the first and the second drivers, 510 and 520 respectively. Alternatively, the data transmission rates are determined via the hardware configuration. The processor 508 divides up each data packet into variously sized fragments. Preferably, the processor 508 divides up the data packets into large and small data packet fragments such that the large data packet is N times the size as the small fragment where N is a function of the up link rate differential. In the example shown in FIG. 8, the large data packet is 4 times the size of the small fragment.

The processor 508 allocates the data packet fragments contained within queues 502, 504, and 506 for transmission over the transmission channels making up the symmetric interface. In the case where the data fragments are uniform in size, the processor 508 allocates a different rate of data to the faster up-link 587 than to the slower up-link 593. With respect to the symmetric interface shown in FIG. 8, the processor 508 sends a different rate of data to the fast up-link queue 586 than to the slower queue 592. This difference in data transmission rates attempts to ensure that the interface queues 586 and 592 are generally equivalent in size. The allocation scheme ensures that the rate of sending information over the slower up-link 593 will not cause delays in the overall performance of the system 500.

The processor 508 receives feedback from both the first driver 510 and the second driver 520. The processor 508 utilizes this feedback information to update its estimate as to how much data is contained in queues 582, 584, and 586 of the first asymmetric device 585 and contained in the queues 592, 594, and 596 of the second asymmetric device 590.

The drivers determine the speed of the up-links 587 and 593. The transmission rates may be determined from the interface to the symmetric interface 580 or from information gathered from PPP negotiation. Alternatively, the transmission rates may be user configured.

The drivers also monitor the depths of the asymmetric interface queues. For example, driver 510 monitors the depths of queues 582, 584, and 586 of first asymmetric interface 585. Driver 110 can then inform processor 508 of the current depths of queues 582, 584, and 586. The processor 508 updates the original depth of its corresponding queues 502, 504, and 506. Processor 508 can then remove any skew in queue depth that may have developed between the actual depth of queues and the depths that the processor 508 thinks that the queues are in. The second driver 520 performs a similar monitoring function with respect to queues 592, 594, and 596 of the second asymmetric device 590. Alternatively, where an asymmetric interface comprises more than two asymmetric interfaces, a plurality of drivers are provided with each driver monitoring a separate interface.

The first asymmetric interface 585 maintains its three queues 582, 584, and 586. Each queue is assigned a priority for allocation. As the processor 508 allocates data packet fragments to asymmetric interface 585, the interface 585 places these data packet fragments into the proper class of service queue. The interface 585 then pulls off the class of data from the queue having the highest priority. These data packet fragments are then transmitted over a line. The second asymmetric device 590 performs a similar allocation function with respect to its three queues 592, 594, and 596.

While the invention has been described in conjunction with presently preferred embodiments of the invention, persons of skill in the art will appreciate that variations may be made without departure from the scope and spirit of the invention. This true scope and spirit is defined by the appended claims, as interpreted in light of the foregoing.

We claim:

1. A method for communicating packet fragments over a symmetrical interface with reversed asymmetrical links, comprising in combination the steps of:

coupling a first asymmetric interface to a computing device, the first asymmetric interface having an up-link transmission rate and a down-link receiving rate, the up-link rate being greater than the down-link rate, the difference between the up-link rate and the down-link rate defining a first asymmetric difference; and coupling a second asymmetric interface to the computing device, the second asymmetric interface having a down-link receiving rate and an up-link transmission rate, the down-link rate being greater than the up-link rate, the difference between the down-link rate and the up-link rate of the second asymmetric interface defining a second asymmetric difference, the second asymmetric difference being substantially equal to the first asymmetric difference.

2. The method of claim 1, further comprising the steps of:

using a first driver to determine the up-link rate of the first asymmetric interface;

using a second driver to determine the up-link rate of the second asymmetric interface;

transmitting a packet fragment over the second asymmetric interface; and transmitting a plurality of packet fragments over the first asymmetric interface based on a difference between the up-link rate of the first asymmetric interface and the up-link rate of the second asymmetric interface.

3. The method of claim 1, further comprising the steps of:

using a first driver to determine the down-link rate of the first asymmetric interface;

using a second driver to determine the down-link rate of the second asymmetric interface;

receiving a packet fragment over the second asymmetric interface; and receiving a plurality of packet fragments over the first asymmetric interface based on a difference between the down-link rate of the first asymmetric interface and the down-link rate of the second asymmetric interface.

4. The method of claim 1, wherein the first asymmetric interface comprises at least one asymmetric link having a first transmitting channel for transmitting a first set of packet fragments and a first receiving channel for receiving a second set of packet fragments.

5. The method of claim 4, wherein the second asymmetric interface comprises at least one asymmetric link having a second receiving channel for receiving a first set of packet fragments and a second transmitting channel for transmitting a second set of packet fragments.

6. The method of claim 5, further comprising the steps of:

determining an up-link transmission rate of the first transmitting channel;

determining an up-link transmission rate of the second transmitting channel; and using an adaptive queuing technique to allocate packet fragments to be transmitted such that a greater number of packet fragments are transmitted by the first transmitting channel than by the second transmitting channel.

7. The method of claim 5, further comprising the steps of:

determining an up-link transmission rate of the first transmitting channel;

determining an up-link transmission rate of the second transmitting channel;

assigning a first class of service to the first transmitting channel according to its up-link rate;

assigning a second class of service to the second transmitting channel according to its up-link rate;

assigning a first or a second class of service to a packet fragment; and up-linking the packet fragment according to its assigned class of service.

8. The method of claim 5, further comprising the steps of:
   determining a down-link receiving rate of the first receiving channel;
   determining a down-link receiving rate of the second receiving channel; and
   using an adaptive queuing technique to allocate packet fragments to be received such that a greater number of packet fragments are received over the second receiving channel than over the first receiving channel.

9. The method of claim 5, further comprising the steps of:
   determining a down-link receiving rate of the first receiving channel;
   determining a down-link receiving rate of the second receiving channel;
   assigning a first class of service to the first receiving channel according to its down-link rate;
   assigning a second class of service to the second receiving channel according to its down-link rate;
   assigning a first or a second class of service to a packet fragment; and
   down-linking the packet fragment according to its assigned class of service.

10. The method of claim 5, further comprising the steps of:
    using a first diver to determine an up-link rate of the first transmitting channel;
    using a second driver to determine an up-link rate of the second transmitting channel;
    assigning a first class of service according to the up-link rate of the first transmitting channel;
    assigning a second class of service according to the up-link rate of the second transmitting channel;
    assigning a first or a second class of service to a packet fragment; and
    up-linking the packet fragment according to its assigned class of service.

11. The method of claim 1, further comprising the steps of:
    determining the up-link transmission rate of the first asymmetric interface;
    determining the up-link transmission rate of the second asymmetric interface;
    transmitting a first packet fragment over the second asymmetric interface; and
    transmitting a plurality of packet fragments over the first asymmetric interface.

12. The method of claim 1, further comprising the step of receiving delay sensitive packet fragments by way of the second linking interface.

13. A multiple parallel asymmetric interface with reversed asymmetric links, comprising:
    a first asymmetric interface having an up-link data transmission rate and a down-link data receiving rate, the down-link rate being less than the up-link rate wherein a difference between the up-link rate and the down-link rate defines a first asymmetric difference, and
    a second asymmetric interface having a down-link data receiving rate and an up-link data transmission rate, the up-link rate being less than the down-link rate wherein a difference between the down-link rate and the up-link rate defines a second asymmetric difference, the second asymmetric difference being generally equivalent to the first asymmetric difference.

14. The device of claim 13, wherein the first asymmetric interface is an asymmetrical digital subscriber line interface.

15. The device of claim 13, wherein the first asymmetric interface is a cable modem interface.

16. The device of claim 13, wherein the first asymmetric interface comprises at least one asymmetric link having a first transmission channel for transmitting a first set of packet fragments and a first receiving channel for receiving a second set of packet fragments.

17. The device of claim 16, wherein the first transmission channel has a data transmission rate of 4 megabits per second.

18. The device of claim 16, wherein the first receiving channel has a data receiving rate of 640 kilobits per second.

19. The device of claim 16, wherein the second asymmetric interface comprises at least one asymmetric link having a second receiving channel for receiving a first set of packet fragments and a second transmission channel for transmitting a second set of packet fragments.

20. The device of claim 19, wherein the second transmission channel has a data transmission rate of 640 kilobits per second.

21. The device of claim 19, wherein a packet fragment of the first set of packet fragments transmitted by the first transmission channel is larger than a packet fragment of the second set of packet fragments transmitted by the second transmission channel.

22. The device of claim 21, wherein a packet fragment of the first set of packet fragments received by the second receiving channel is larger than a packet fragment of the second set of packet fragments received by the first receiving channel.

23. The device of claim 19, wherein the second receiving channel has a data receiving rate of 4 megabits per second.

24. An apparatus for symmetrically linking packet fragments, the apparatus comprising:
    a first asymmetric linking interface having a plurality of first receiving channels for receiving packet fragments and a plurality of first transmitting channels for transmitting packet fragments, and
    a second asymmetric linking interface having a plurality of second transmitting channels for transmitting packet fragments and a plurality of second receiving channels for receiving packet fragments,
    wherein the plurality of first receiving channels and the plurality of second receiving channels together define a receiving link having a down-link receiving rate and wherein the plurality of first transmitting channels and the plurality of second transmitting channels together define an up-link having an up-link transmission rate, the up-link rate generally equivalent to the down-link rate.

25. The apparatus of claim 24, further comprising a first set of similarly sized packet fragments transmitted by the plurality of first transmitting channels and a second set of similarly sized packet fragments transmitted by the plurality of second transmitting channels.

26. The apparatus of claim 25, wherein an information packet of the first set of packet fragments is generally larger than a packet fragment of the second set of packet fragments.

27. The apparatus of claim 24, further comprising a first set of similarly sized packet fragments received by the plurality of second receiving channels and a second set of similarly sized packet fragments received by the plurality of first receiving channels.

28. The apparatus of claim 27, wherein a packet fragment of the first set of packet fragments is generally larger in size than a packet fragment of the second set of packet fragments.

29. A multiple parallel asymmetric interface with reversed asymmetric links, comprising:
- a computing device;
- a first asymmetric linking interface having a plurality of first receiving channels for receiving packet fragments to the computing device and a plurality of first transmitting channels for transmitting packet fragments from the computing device, and
- a second asymmetric linking interface having a plurality of second transmitting channels for transmitting packet fragments from the computing device and a plurality of second receiving channels for receiving packet fragments to the computing device,
- wherein the plurality of first receiving channels and the plurality of second receiving channels define a down-link having a down-link receiving rate and wherein the plurality of first transmitting channels and the plurality of first transmitting channels define an up-link having an up-link transmission rate, the up-link rate generally equivalent to the down-link rate.

30. The system of claim 29, wherein the computing device is a personal computer.

31. The system of claim 29, wherein the computing device is a network server.

* * * * *